(No Model.)
A. B. ADAMS.
UNIVERSAL HOUSEHOLD MACHINE.
No. 461,697. Patented Oct. 20, 1891.
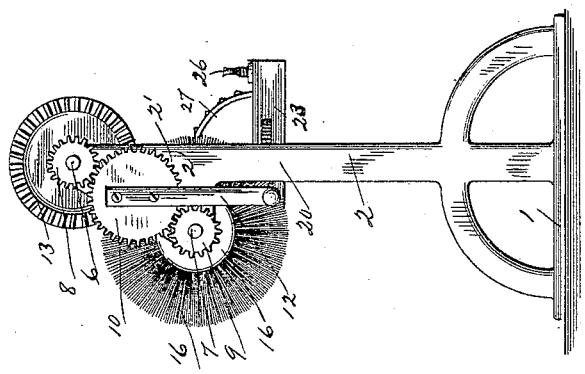
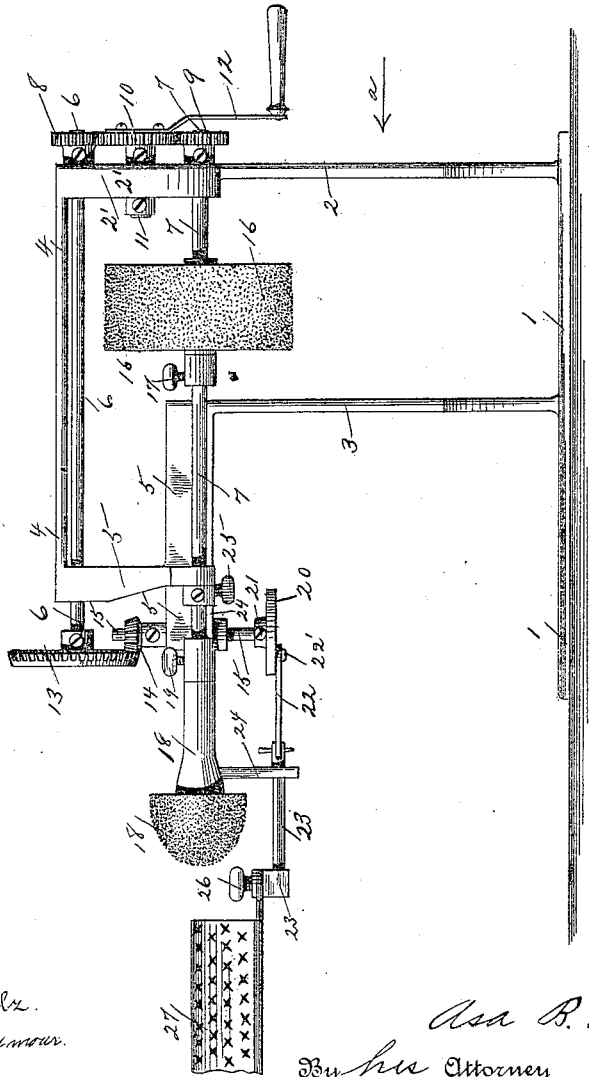
Witnesses
Chas. F. Schmelz.
Edmund F. Seymour.
Inventor
Asa B. Adams
By his Attorney
John C. Dewey
THE NORRIS PETERS CO., PHOTO-LITHO., WASHINGTON, D. C.

UNITED STATES PATENT OFFICE.

ASA B. ADAMS, OF WORCESTER, MASSACHUSETTS.

UNIVERSAL HOUSEHOLD MACHINE.

SPECIFICATION forming part of Letters Patent No. 461,697, dated October 20, 1891.

Application filed October 15, 1890. Serial No. 368,197. (No model.)

*To all whom it may concern:*

Be it known that I, ASA B. ADAMS, a citizen of the United States, residing in Worcester, in the county of Worcester and State of Massachusetts, have invented certain new and useful Improvements in Universal Household Machines; and I do hereby declare that the following is a full, clear, and exact description thereof, which, in connection with the drawings making a part of this specification, will enable others skilled in the art to which the invention belongs to make and use the same.

My invention relates to a household machine or to a machine adapted to be used for kitchen or household purposes; and the object of my invention is to provide a machine simple in construction and operation, with which may be combined different household or kitchen utensils.

My invention consists in certain novel features of construction and operation of a household machine, above referred to, as will hereinafter be fully described.

Referring to the drawings, Figure 1 is a side elevation of my household machine; and Fig. 2 is an end view of the machine shown in Fig. 1, looking in the direction of arrow $a$, same figure.

In the accompanying drawings, the frame of the machine consists of the base-plate 1 and the two uprights or standards 2 and 3, and the cross-bar 4, connecting the upper end of the standard 2 to an angle-piece 5 on the upper end of the standard 3. The frame of the machine is preferably made of metal cast in one piece, and upon it are supported the operative parts of the machine. The standard 2 is enlarged at its upper end 2', and is provided with bearings for the two parallel and horizontal shafts 6 and 7, (see Fig. 1,) carrying pinions 8 and 9, driven by an intermediate gear 10, supported on a stud 11, and provided with a handle 12 for revolving the same. The opposite ends of the shafts 6 and 7 are supported in bearings in the angle-piece 5 of the frame, and on the shaft 6 is a beveled gear 13, fast thereon, which meshes with and drives a beveled gear 14, fast on the upper end of the vertical shaft 15, supported in the outer end of the frame part 5. It will thus be seen that by means of the handle 12, through the system of gears 8, 9, and 10, the horizontal shafts 6 and 7 and the vertical shaft 15 are revolved and the attachments connected with said shafts are operated.

Referring to Fig. 1, I have shown a polishing-brush 16, secured on a shaft 7 by a thumb-screw 17, and a blacking-brush 18, secured on end of said shaft by a thumb-screw 19. To the lower end of the vertical shaft 15 is attached a crank-disk 20 by a screw 21, and to said crank-disk 20 is pivoted by a screw 22' a crank-connector 22, the outer end of which is attached to a plunger 23, supported and adapted to have a reciprocating motion back and forth in a horizontal plane in the lower end of the angle-arm 24, secured to the outer end of the frame part 5 by a thumb-screw 25. Upon the outer end of the plunger 23, secured by a thumb-screw 26, is a grater 27. It will be seen that the revolution of the shafts 6 and 7 by means of the handle 12 and system of gears will cause the brushes 16 and 18 to be revolved and the grater 27 to be moved back and forth in a horizontal plane.

The advantages of my universal household machine will be appreciated by those skilled in the art. It is of simple construction and operation and not liable to get out of order, and by slight alterations in the parts thereof may be adapted to be used for a great many household purposes, and have combined therewith all kinds of household utensils.

The details of construction of the several parts of my household machine may be varied some from what is shown and described, if desired.

Having thus described my invention, what I claim as new, and desire to secure by Letters Patent, is—

In a universal household machine of the class described, the combination, with a frame, two parallel horizontal shafts supported thereon, and a system of gears for operating said shafts, of a vertical shaft supported on said frame, having a beveled gear at its upper end adapted to engage with and be driven by a beveled gear on one of the horizontal shafts, and a crank-disk on its lower end provided with a crank-connector, adapted to give a reciprocating motion to a household utensil connected therewith, substantially as set forth.

ASA B. ADAMS.

Witnesses:
JOHN C. DEWEY,
EDMUND F. SEYMOUR.